United States Patent
Zeighami et al.

(10) Patent No.: US 12,547,476 B2
(45) Date of Patent: *Feb. 10, 2026

(54) BURST DATACENTER CAPACITY FOR HYPERSCALE WORKLOADS

(71) Applicant: Oracle International Corporation, Redwood Shores, CA (US)

(72) Inventors: Roy Mehdi Zeighami, Fall City, WA (US); Craig Alderson Pennington, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 672 days.

This patent is subject to a terminal disclaimer.

(21) Appl. No.: 17/903,924

(22) Filed: Sep. 6, 2022

(65) Prior Publication Data

US 2024/0078139 A1    Mar. 7, 2024

(51) Int. Cl.
*G06F 9/50* (2006.01)
*G06F 11/30* (2006.01)
*H02J 3/00* (2006.01)
*H02J 9/06* (2006.01)
*H02J 3/007* (2026.01)

(52) U.S. Cl.
CPC .......... *G06F 9/5094* (2013.01); *G06F 9/5072* (2013.01); *G06F 11/3062* (2013.01); *G06F 2209/508* (2013.01); *H02J 3/007* (2020.01); *H02J 9/068* (2020.01)

(58) Field of Classification Search
None
See application file for complete search history.

(56) References Cited

U.S. PATENT DOCUMENTS

| | | |
|---|---|---|
| 8,707,095 B2 | 4/2014 | Grimshaw |
| 10,928,878 B2 | 2/2021 | Morales et al. |
| 2010/0036903 A1 | 2/2010 | Ahmad et al. |
| 2013/0020872 A1* | 1/2013 | Kinnard .................. G06F 1/263 307/64 |
| 2016/0370819 A1 | 12/2016 | Forbes, Jr. |

(Continued)

OTHER PUBLICATIONS

"Data Center Redundancy: N+1, 2N, 2(N+1) or 3N2 (Distributed)", Datacentre.com, Available Online at:datacenter.com/news_and_insight/data-center-redundancy-2plus1-2n-distributed-redundancy/, Dec. 19, 2018, 10 pages.

(Continued)

*Primary Examiner* — Eric C Wai
(74) *Attorney, Agent, or Firm* — Invoke

(57) ABSTRACT

In some aspects, techniques may include monitoring a primary load of a datacenter and a reserve load of the datacenter. The primary load and reserve load can be monitored by a computing device. The primary load of the datacenter can be configured to be powered by one or more primary generator blocks having a primary capacity, and the reserve load of the datacenter can be configured to be powered by one or more reserve generator blocks having a reserve capacity. Also, the techniques may include detecting that the primary load of the datacenter exceeds the primary capacity. In addition, the techniques may include connecting the reserve generator blocks to at least one of the primary generator blocks and the primary load using a computing device switch.

20 Claims, 10 Drawing Sheets

(56) References Cited

U.S. PATENT DOCUMENTS

2019/0258307 A1    8/2019   Shaikh et al.
2020/0099251 A1    3/2020   Totani et al.
2021/0344217 A1   11/2021   Shaikh et al.
2022/0129601 A1    4/2022   Kar et al.

OTHER PUBLICATIONS

Pelley et al., "Power Routing: Dynamic Power Provisioning in the Data Center", ACM SIGPLAN Notices, vol. 45, No. 3, Mar. 13-17, 2010, pp. 231-242.

U.S. Appl. No. 18/074,332, "Non-Final Office Action", mailed Mar. 31, 2023, 10 pages.

Zhang et al., "Flex: High-Availability Datacenters with Zero Reserved Power", Microsoft, Proceedings of the International Symposium on Computer Architecture (ISCA), Available Online at: www.microsoft.com/en-us/research/publication/flex-high-availability-datacenters-with-zero-reserved-power/, Jun. 2021, 2 pages.

\* cited by examiner

BURST DATACENTER CAPACITY FOR HYPERSCALE WORKLOADS

ARTICLE I. BACKGROUND

Power generation can be a limiting factor in constructing datacenters or increasing datacenter capacity. Datacenters are constructed with redundant power systems to ensure high server availability. However, this redundant power capacity is mostly unused. Accordingly, there is unused datacenter power capacity, and improvements to datacenter design are desirable.

ARTICLE II. BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method may include monitoring a primary load of a datacenter and a reserve load of the datacenter. The monitoring can be performed by a computing device. The primary load of the datacenter can be configured to be powered by one or more primary generator blocks and one or more reserve generator blocks. The reserve load of the datacenter can be configured to be powered by the reserve generator blocks. The primary generator blocks can have a primary capacity, and the one or more reserve generator blocks can have a reserve capacity. The method may include detecting that the primary load of the datacenter exceeds the primary capacity using a computing device. The method may include connecting the reserve generator blocks to at least one of the primary generator blocks and the primary load using a switch. Other embodiments of this aspect include corresponding computer systems, apparatus, and computer programs recorded on one or more computer storage devices, each configured to perform the actions of the methods.

Implementations may include one or more of the following features. A method where connecting the reserve generator blocks may further include: disconnecting the reserve load from the reserve generator block. The reserve load can be disconnected by a circuit breaker controlled by a computing device. A method where the reserve load is disconnected if a combined load exceeds a combined capacity. The combined load can include the primary load and the reserve load. The combined capacity may include the primary capacity and the reserve capacity. A method where power is supplied to the reserve load by the one or more reserve generator blocks and an utility power connection, where the utility power connection provides power to at least half of the reserve load. A method where detecting whether primary load exceeds the primary capacity can include determining that a primary generator block has failed. A Method where the primary load has 99.999% availability. Method where the reserve load has 99.9% availability. Implementations of the described techniques may include hardware, a method or process, or a computer tangible medium.

In one general aspect, a system may include a non-transitory computer-readable medium storing computer-executable program instructions. The system may include a processing device communicatively coupled to the non-transitory computer-readable medium for executing the computer-executable program instructions, where executing the computer-executable program instructions configures the processing device to perform operations that may include: monitoring a primary load and a reserve load of the datacenter. The primary load of the datacenter can be powered by one or more primary generator blocks having a primary capacity. The reserve load of the datacenter can be configured to be powered by one or more reserve generator blocks having a reserve capacity. The instructions can include detecting that the primary load of the datacenter exceeds the primary capacity. The instructions may include connecting the reserve generator blocks to at least one of the primary generator blocks and the primary load. Other embodiments of this aspect include corresponding computer systems, apparatus, and computer programs recorded on one or more computer storage devices, each configured to perform the actions of the methods.

In one general aspect, a non-transitory computer-readable storage medium storing computer-executable program instructions may include monitoring a primary load and a reserve load of the datacenter. The primary load of the datacenter is powered one or more primary generator blocks having a primary capacity, and the reserve load of the datacenter is powered by one or more reserve generator blocks having a reserve capacity. The instructions may include detecting, by the computing device, that the primary load of the datacenter exceeds the primary capacity. Instructions may include connecting the reserve generator blocks to at least one of the primary generator blocks and the primary load using a switch controlled by a computing device. Other embodiments of this aspect include corresponding computer systems, apparatus, and computer programs recorded on one or more computer storage devices, each configured to perform the actions of the methods.

ARTICLE III. BRIEF DESCRIPTION OF THE DRAWINGS

ARTICLE IV. DETAILED DESCRIPTION

Figure 1:
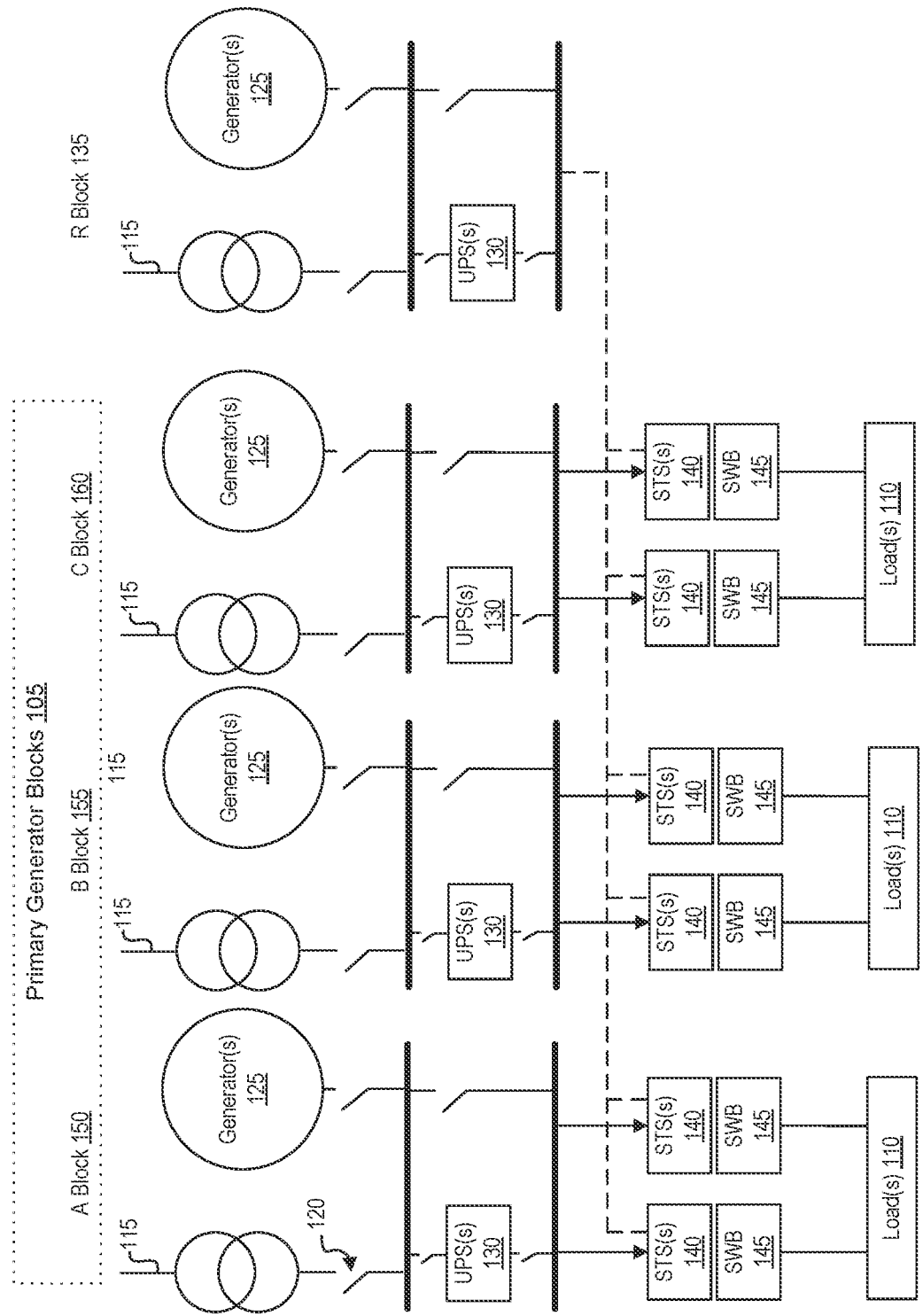
FIG. 1 is a diagram of a block redundant power architecture during normal operation according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Datacenters are designed to minimize interruptions in server availability. Often, systems within the datacenter are designed redundantly so that the failure of a single component will not cause an interruption in service. For example, backup generator blocks can supplement the power supplied to the datacenter's servers from a connection to a local power grid. In addition, a proportion of the generator blocks are "reserve" or backup generator blocks that may not be connected to a load under normal operating conditions. Accordingly, a reserve generator block can supply power to a server even if the power grid and the "primary," or non-backup, generator block fail.

A redundant datacenter design can be wasteful, and redundant systems are often idle with unused capacity. For example, a reserve generator block may only start under rare circumstances when two other power sources are unavailable. Such reserve generator blocks may need to supply power to the primary load for less than nine hours in a typical year. An accepted industry standard is that a load should be available 99.999% of the time with less than six minutes of downtime a year.

Some time-sensitive high-priority loads may require this industry standard, called five nines of availability, however, this standard may be excessive in some circumstances. For example, a server processing a company's payroll, that may need to be completed in a few days, may not need five nines of availability because a several minute delay in availability may not be noticed by the customer.

In addition, the five nines (e.g., 99.999%) availability standard is based on assumptions of server downtime that were made using outdated technology. For instance, the most recent Institute of Electrical and Electronics Engineers (IEEE) standard for five nines (e.g., IEEE Std. 3006.7, IEEE Recommended Practice for Determining the Reliability of 7×24 Continuous Power Systems in Industrial and Commercial Facilities) was published in 2013. The calculations in the 3006.7 standard were made based on reliability of power system equipment, such as generators and uninterruptable power supplies (UPSs), from 2013. Improvements in technology since the standard was updated can mean that the reserve generator blocks may be needed for even less than the approximately nine hours a year suggested by the standards.

Accordingly, datacenter reserve generator blocks are expensive resources that are mostly unused. The reserve blocks can be used to provide backup power for a reserve load at a reduced availability standard such as three nines, or 99.9%, availability. This reserve load can be a dual corded opportunistic load that is connected to utility power and a reserve generator block. The reserve load can be dropped, and the reserve generator block can provide power to the primary load, if the primary load exceeds the primary generator blocks' capacity. For example, the primary load may exceed the primary generator block's capacity if a component in the primary generator blocks fails. The reserve load can be disconnected from the reserve generator and will continue to receive power unless the utility power connection fails.

In an illustrative example, primary loads, with service level agreements mandating five nines of availability, are connected to five primary generator blocks. In the event a primary generator block fails, the primary load for the failed block can be transferred, via a switch, to a reserve generator block. Each generator block includes a utility connection, a generator, and a battery, called an uninterruptable power supply (UPS), that provides power to the loads while the generator activates. A reserve load is connected to the reserve power block by a circuit breaker, and the reserve load is also connected to a local power grid through a utility power connection.

Continuing the example, a primary load experiences a drop in power because the utility power to a primary generator block is interrupted. The primary generator block attempts to provide backup power to the primary load but the block's UPS fails to activate. The power supplied by the failing generator block begins to drop, and, the switch, called a static transfer switch (STS), detects the drop in power from the block. In response, the STS disconnects the primary generator block and connects the reserve generator to the load primary load and the reserve block UPS provides power until the reserve generator fires.

The reserve generator block attempts to supply power to both the reserve load and the primary load, but the combined load exceeds the reserve generator block's capacity. To ensure the primary load continues to receive power, the circuit breaker opens disconnecting the reserve load from the reserve generator block so that the block's power can be supplied to the primary load.

FIG. 1 is a diagram of a block redundant power architecture 100 during normal operation according to an embodiment. The architecture can be part of a block redundant (BR) architecture, under normal operating conditions, primary generator blocks 105 provides power to load(s) 110 using a connection 115 to utility power. While switches in FIGS. 1-4, such as switch 120, are shown in an open position, this is mostly to illustrate the existence of a switch at a specific location, and should not be construed as showing an open or closed connection. Instead, the switch 120, and any other switch illustrated herein, can be open or closed, and can be controlled to change from open to closed or closed to open. Normal operating conditions can include interruptions in utility power, and, if utility power is interrupted, a primary generator block can use generator(s) 125, in addition to an uninterruptable power supply (UPS(s)) 130, to provide power to load(s) 110. A load, such as load(s) 110, can be one or more electronic or computing devices. For example, load(s) 110 can include server computers, personal computers, storage devices, networking devices, cooling devices, fans, environmental monitors, and the like. Under normal operating conditions load(s) 110 should not exceed the capacity of generator blocks 105.

UPS(s) 130 is an electronic device that can provide emergency power upon detecting an interruption in utility power. A primary generator block can have one or more UPS(s) 130 and one or more generator(s) 125. Emergency power can be power that can be supplied by UPS(s) 130 in a short amount of time (e.g. 25 milliseconds or less). One or more batteries in the UPS(s) 130 can supply emergency power to load(s) 110 while generator(s) 125 are activated. The time to readiness, or the time to activate generator(s) 125, can be between ten and fifteen seconds. In addition to providing emergency power, UPS(s) 130 is a conduit for power from a utility. Also, issues with the utility power can be addressed by UPS(s) 130, and, for instance, voltage spikes, voltage sags, noise, etc. can be corrected by UPS(s) 130.

The BR power architecture can include one or more reserve (R) blocks 135. Unless primary generator blocks 105 fail, R block 135 may not be active, and R block 135 can be connected to a static transfer switch (STS(s)) 140 without providing power to load(s) 110. STS(s) 140 can be an electronic device that can transfer power from a primary power source to an alternate power source in a short period of time (e.g., 4 milliseconds). STS(s) 140 may switch to an alternative power source if the power from a primary power source (e.g., the power source providing power through the STS(s)) drops below a threshold. The load(s) 110 can be connected to STS(S) 140 via a switchboard (SWB) 145 that can distribute power to the load(s) 110. A primary generator block 105, such as A block, B block, or C block 150, 155, 160, can be connected to one or more loads and SWB 145 can distribute power to the one or more loads. For instance, SWB 145 may be used to disconnect power from a server (e.g., de-energize a server) in order to perform maintenance on that server. While architecture 100 shows three primary generator blocks 105 and one R block 135, other configurations are contemplated such as configurations with ratios of primary generator blocks to reserve blocks of 3.1, 5:1, 7:1, 12:1.

Figure 2:
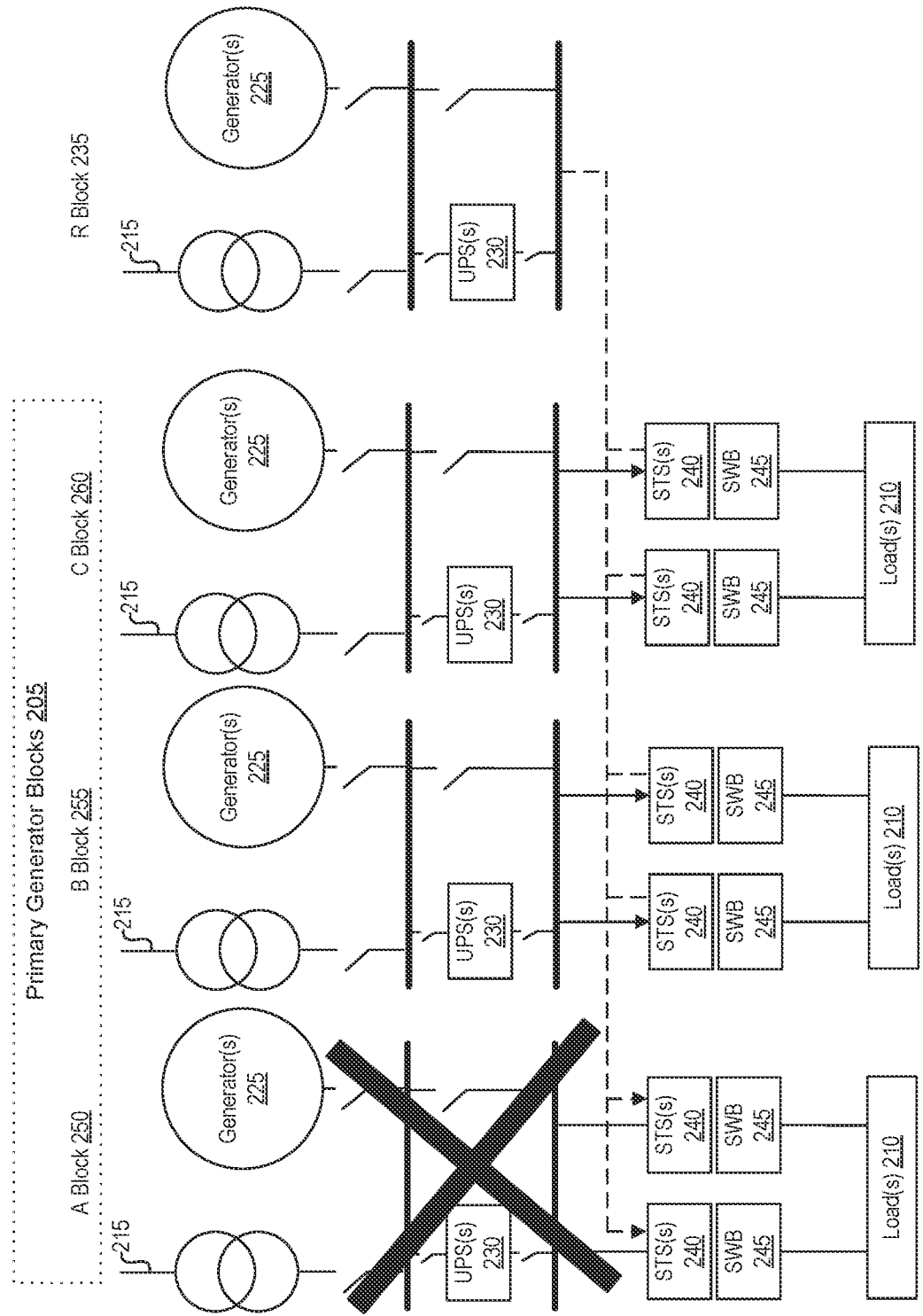
FIG. 2 is a diagram of a block redundant power architecture during a failure scenario according to an embodiment.

FIG. 2 is a diagram 200 of a block redundant power architecture during a failure scenario according to an embodiment. As described above, the primary generator blocks 205 provides power to the load(s) 210 under normal operating conditions. A utility power failure may be a normal operating condition, and a failure condition can be when a primary generator block, of the primary generator blocks 205, cannot provide power to the load(s) 210. A failure condition can be when the utility power, supplied via utility power connection 215, is interrupted and either generator(s) 225 or UPS(s) 230 fails to provide emergency power from one or more of the primary generator blocks 205. A failure condition can occur if, for one of the primary blocks 205, there is a failure of: 1) the utility power connection 215 and the generator(s) 225; 2) The utility power connection 215 and the UPS(s) 230; 3) the UPS(s) 230. If the utility power connection 215 fails but the UPS(s) 230 and generator(s) 225 are operational, the UPS(s) 230 can derive its power from the generator(s) 225. If the generator(s) 225 fail but the UPS(s) 230 and utility power connection 214 are operational then the UPS(s) 230 can continue to supply power without transfer from the utility power connection 215.

When a primary generator block 205 fails (e.g., a failure condition occurs), R block 235 can activate to ensure that power to load(s) 210 is maintained. R block 235 may supply emergency power to load(s) 210 through utility power connection 215, or R block 235 can activate by providing emergency power to load(s) 210 from generator(s) 225. Emergency power can be supplied to load(s) 210 by UPS(S) 230 if there is a delay in the power supplied by generator(s) 225. For example, generator(s) 225 may not be able to supply power during a startup process.

STS(S) 240 can detect that a primary generator block, such as A block 250, B block 255, or C Block 260, is no longer supplying power to load(s) 210. For example, diagram 200 shows a black "X" indicating that A block 250 has failed. STS(s) 240 detects the drop in power supplied by A block 250 and STS(s) 240 switches from a connection with A block 250 to a connection with R block 235 (e.g., the dotted line connection). The R block can supply power to the load(s) 210 until the failed block, in this case A block 250, is returned to service and resumes supplying power to load(s) 210. R block 235 can supply power to load(s) 210 during failure conditions that can include damage or failure of components that cause A block 250 to be inoperable, or regular maintenance of A block 250.

Figure 3:
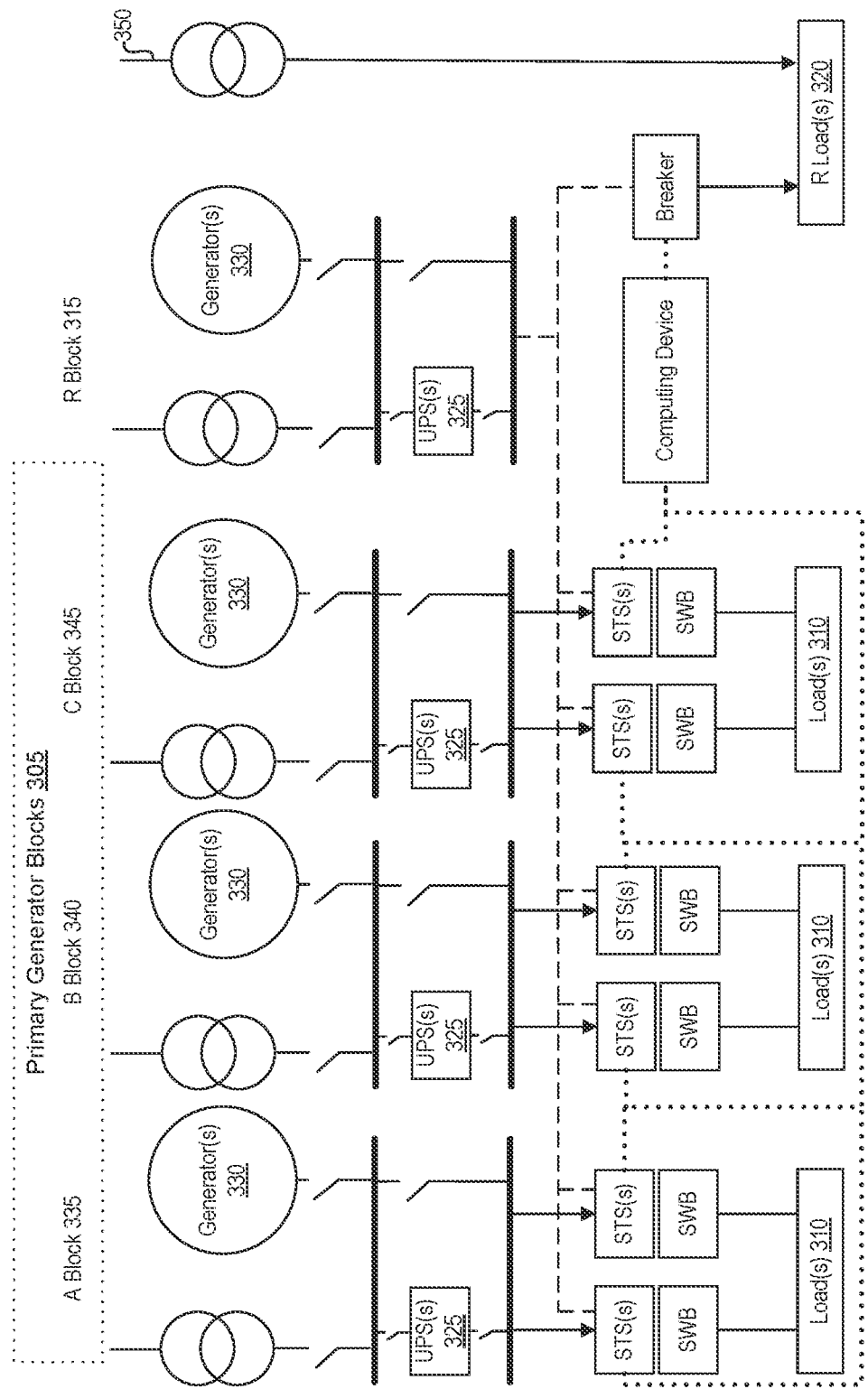
FIG. 3 is a diagram of a capacity harvesting power architecture during normal operation according to an embodiment.

FIG. 3 is a diagram of a capacity harvesting power architecture 300 during normal operation according to an embodiment. The architecture 300 can include primary generator blocks 305 that supply power to loads(s) 310, and a reserve (R) block 315 that can supply power to reserve (R) load(s) 320. While architecture 300 shows three primary blocks 305 and one R block 315, other configurations are contemplated such as configurations with ratios of primary blocks to reserve blocks of 3.1, 51, 7:1, 12:1.

Primary generator blocks 305, and reserve block 315, can supply utility power to the load(s) 310, or R load(s) 320 via UPS(S) 325. If utility power to a primary generator block is interrupted, UPS(s) 325 can supply emergency power to load(s) 310, or R load 320, during the delay between activating the generator(s) 330 and when the generator(s) is able to supply sufficient power to support the load(s). For example, a turbine in generator(s) 330 may take several seconds to reach enough speed to generate power.

During normal operations, primary generator blocks 305, including A block 335, B block 340, and C block 345, can supply power to load(s) 310, and R block 315 can supply power to R load(s) 320. Load(s) 310 can be high availability loads that, in conjunction with R block 315, provide 99.999% uptime over a given time period (e.g., "five nines" of availability). Primary generator blocks 305 can supply 99.999% availability because the R block 315 can provide power if one of the primary generator blocks 305 fails. A system with 99.999% uptime should have 5.26 minutes or less of downtime per year. The standards for a commercial power system that can provide "five nines" of availability are defined in, for example, "IEEE Recommended Practice for the Design of Reliable Industrial and Commercial Power Systems," in IEEE Std 493-2007 (Revision of IEEE Std 493-1997), vol., no., pp. 1-383, 25 Jun. 2007, doi: 10.1109/IEEESTD.2007.380668.

R load(s) 320 can have a lower availability than the load(s) 310. For example, R load(s) 320 can have 99.99%, 99.9%, or 99% availability. Under normal operations, power is supplied to R Load(s) via a utility power connection 350 and a utility power connection through R Block 315 (e.g., via UPS(s) 325). 50% of R load(s) 320 can be supplied by R block 315 and the remaining 50% can be supplied by utility power connection 350. R block 315 may supply a greater or lesser proportion of the power delivered to R load(s) 320 (e.g., 5%, 25% 45%, 55%, 75%, 95% of the power to R load(s)). During normal operations, if R block 315 fails, utility power connection 350 can supply the entire power to R load(s) 320. If utility power connection 350 fails, R block 315 can supply the entire power to R load(s) 320.

Figure 4:
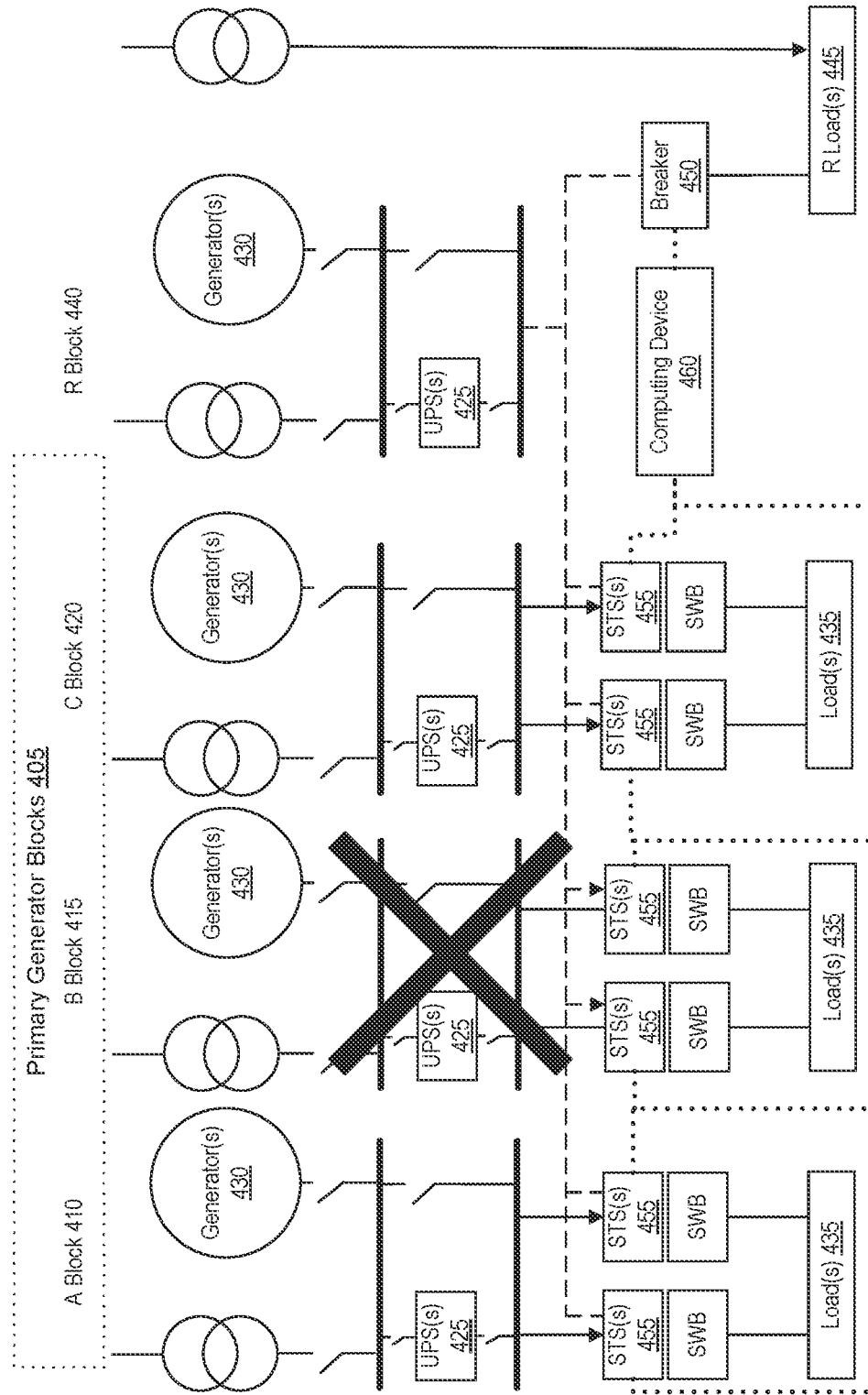
FIG. 4 is a diagram of a capacity harvesting power architecture during a failure scenario according to an embodiment.

FIG. 4 is a diagram of a capacity harvesting power architecture 400 during a failure scenario according to an embodiment. A failure scenario can occur when one of the primary generator blocks 405 fails. A primary generator block, such as A block 410, B block 415, or C block 420, can fail when a UPS(s) 425 or generator(s) 430 fails & Tx 417 failes. (not designated but perhaps we call the Txs 412,417, 422 —in this case the failure of Tx 417). In architecture 400, B block 415 is shown with a black "X" to show that the block has failed, however, a failure scenario can occur when any primary block has failed. A failure scenario can occur when there is a drop in the power supplied by the primary generator blocks 405 to load(s) 435, and, for instance, a failure scenario can occur when one or more generator(s) & Tx or UPS(s) in a primary generator block fails.

R-block 440 can be disconnected from one or more of the R load(s) 445 if one of the primary generator blocks 405 fails and one or more STS(s) 455 switch from primary power to reserve (R) power. The R load(s) may be disconnected when one of the primary blocks 405 fails. Primary power can be supplied by one of the primary generator blocks 405 and reserve power can be supplied by reserve block (440). The R load(s) 445 can be disconnected from R block 440 by a circuit breaker (e.g., breaker 450). A breaker 450 can disconnect the R block 440 from the R load(s) 445 if the sum of the load(s) 435 on primary generator blocks 405 and R load(s) 445 exceeds the capacity of R block 440. If one of the primary generator blocks 504 fails, the breaker 450 can disconnect one or more of the R load(s) 445 if the combined load(s) 435, 445 exceed the capacity of the available blocks (e.g., primary generator blocks 405, R block 440). Breaker 450 can disconnect the R block 440 from R load(s) 445 if the sum of the load(s) 435 one of the primary generator blocks 405 (e.g., A block 410, B block 415, or C block 420) and R load(s) 445 exceeds the capacity of R block 445. Breaker 450 can disconnect the R block 440 from the R load(s) 445 if a threshold number of STS(s) 455 switch from primary power to R power (e.g., 2 or more STS(s) switch to reserve power).

A computing device 460 can control breaker 450 to disconnect, or connect, R load(s) 445 from R block 440. In some embodiments computing device 460 can be an industrial control system implemented with hardware rather than software. For instance, the industrial control system can be a hardware implemented control system that disconnect the R block any time that one of the primary generator blocks 405 fails. Breaker 450 can be controlled based on signals from STS(s) 455, and, for instance, the signals can indicate whether the STS(s) 455 are connected to primary power or reserve (R) power. Computing device 460 can open breaker 450 if one or more of the STS(s) 455, or a threshold amount of STS(s), have switched to R power (e.g., have switched to receive power from R block 440). Other techniques to determine if breaker 450 should be opened are contemplated. For instance, the voltage, current, resistance, or inductance between primary generator blocks 405 and the load(s) 435 can be measured to determine if breaker 450 should open (e.g., to determine if the primary generator block 405 are providing sufficient power to load(s) 435).

Computing device 460 can close breaker 450 if the computing device determines that R block 440 does not need to supply power to load(s) 435. For example, breaker 450 may have opened by computing device 460 because a UPS(s) 425 in B block 415 failed, and, breaker 450 was closed by computing device 460 after B block 415 was returned to service. Computing device 460 can be a programmable logic device, a personal computer, a system on a chip, a single-board computer (SBC), a field programmable gate assembly (FPGA), an integrated circuit, programmable logic circuit (PLC), and the like.

Figure 5:
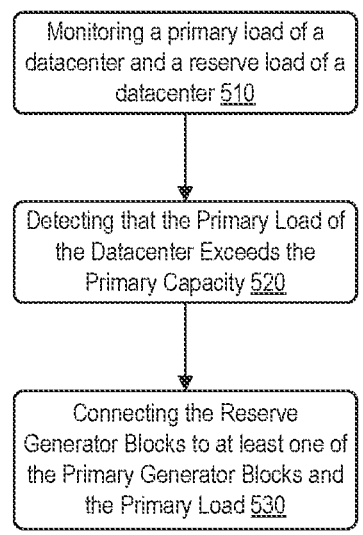
FIG. 5 is a diagram of a method for disconnecting a reserve load from a reserve block according to an embodiment.

FIG. 5 is a diagram of a method for disconnecting a reserve load from a reserve block according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 500 in greater detail, at block 510, the primary load and a reserve load of a datacenter can be monitored. The primary load can be load(s) 110, 210, 310, 435 and the reserve load can be R load(s) 320, 445. The primary and reserve load can be monitored by computing device 460. For example, computing device 460 can receive output from the STS(s), such as STS(s) 140, 240, 455, indicating whether the STS(s) are connected to power from the primary blocks (e.g., 105, 205, 305, 405) or the reserve block such as reserve blocks 135, 235, 315, 440. STS(s) can provide information about the current flowing through the STS(s) to the computing device 460, and the information can be used to monitor the primary load. Generator(s) 125, 225, 330, 430, UPS(s) 130, 230, 325, 425, or breaker 450 can provide information about power provided to the primary or reserve loads to the computing device, and computing device 460 can use the provided information to monitor the primary or reserve loads.

At block 520, whether the primary load of the datacenter exceeds the primary capacity can be determined. The primary capacity can be the power generating capacity of one or more of the primary generator blocks 105, 205, 305, 405. The primary capacity for a primary block can be the sum of the capacity for the generator(s) 125, 225, 330, 430 in one of the primary generator blocks 102, 205, 305, 405. The reserve capacity for a reserve block can be the sum of the capacity for the generator(s) 125, 225, 330, 430 in a R block 135, 235, 315, 440. STS(s) 140, 240, 455 can determine that the primary load has exceeded the primary capacity when the power through the STS drops below a threshold. The power through the STS can be the power provided by one or more of the primary generator blocks.

At block 530, the reserve generator blocks can be connected to at least one of the primary load or the primary generator blocks. The primary load may receive power from both the primary generator blocks and the reserve generator block. The reserve block may be connected to a primary load if the one or more primary generator blocks connected to the primary load are not able to supply sufficient power to the primary load to keep the primary load operational. A primary load, or reserve load, can include server computers, personal computers, storage devices, networking devices, cooling devices, fans, environmental monitors, and the like.

STS(s) 140, 240, 455 can connect the reserve generator block to the primary load by switching from a connection with a primary generator block to a connection with the reserve generator block. A generator block, such as primary generator blocks 105, 205, 305, 405 or R block 135, 235, 315, 440, can be connected to a load by one or more STS(s). For example, a generator block can contain multiple generators and each generator in a block can be connected to a load by a STS. Some or all of the STS(s) can be switched to allow a portion of a load to be to be transferred from one generator block to a different block.

Connecting the reserve generator blocks can include disconnecting the reserve load from the reserve generator block. The reserve load can be disconnected by a circuit breaker such as breaker 450 that can be controlled by, or part of, computing device 460. A utility power connection 115, 215, 350 can supply power to the reserve load after the load is disconnected from the reserve blocks. Computing device 460 can close breaker 450, and restore a connection between the reserve load and reserve block, if the combined load of the primary load, connected to the reserve block, and the reserve load does not exceed a combined power generating capacity of the primary generator blocks, connected to the primary load, and the reserve block (e.g., if the reserve block has sufficient spare capacity to support the reserve load). The reserve block may be connected by one or more circuit breakers to one or more reserve loads and the reserve block can be reconnected to some or all of the reserve load(s). The reserve block may be reconnected if a primary block, that was inoperable because of a component failure or maintenance, can resume generating power. The reserve loads may have different tiers with lower level tiers being disconnected before higher level tiers. The reserve loads can be reconnected to power with higher level tiers being reconnected before lower level tiers. The tiers can be based on priority or service level agreements (SLAs) with lower level tiers having a lower priority and higher level tiers having a higher priority.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
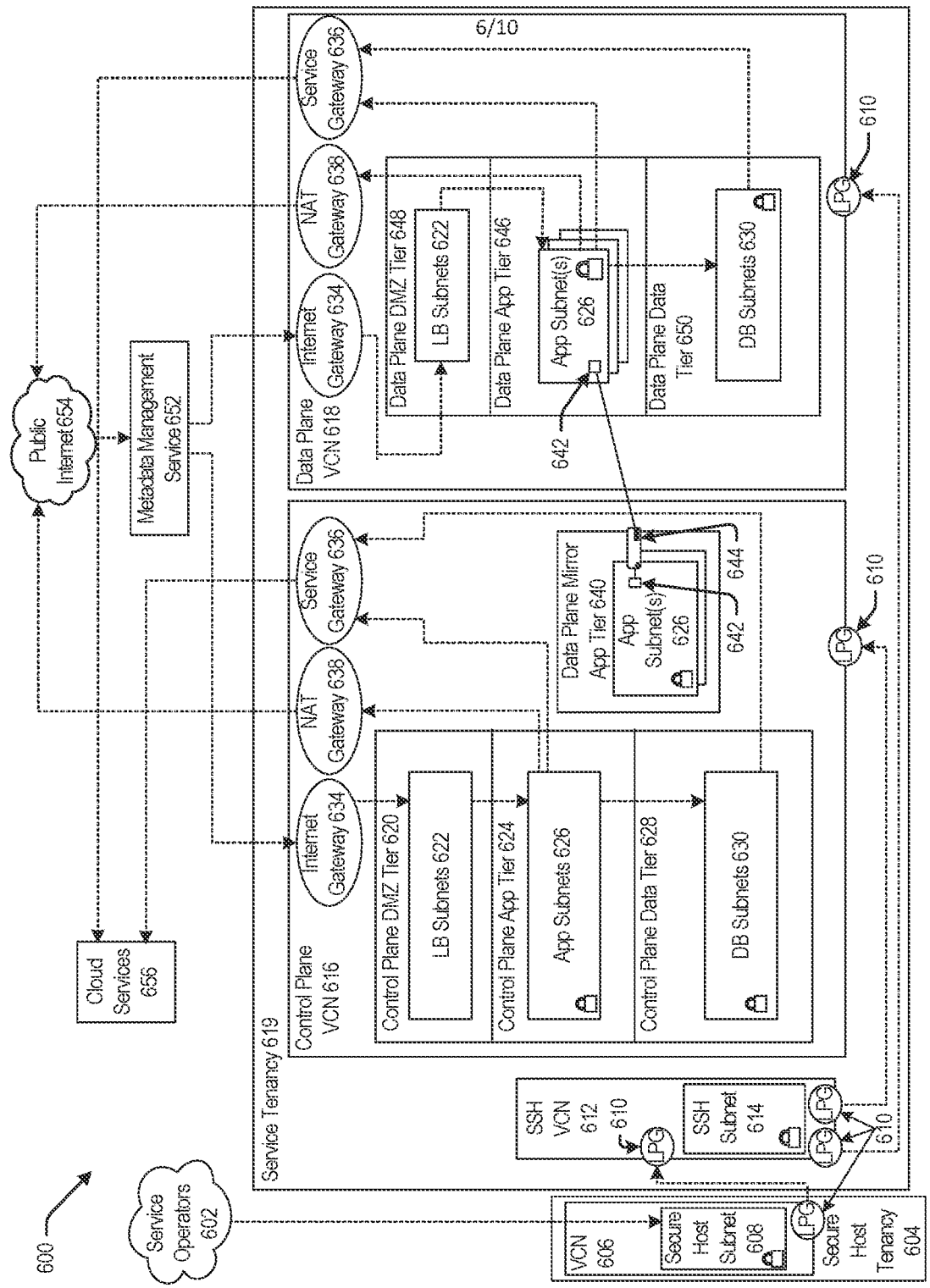
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
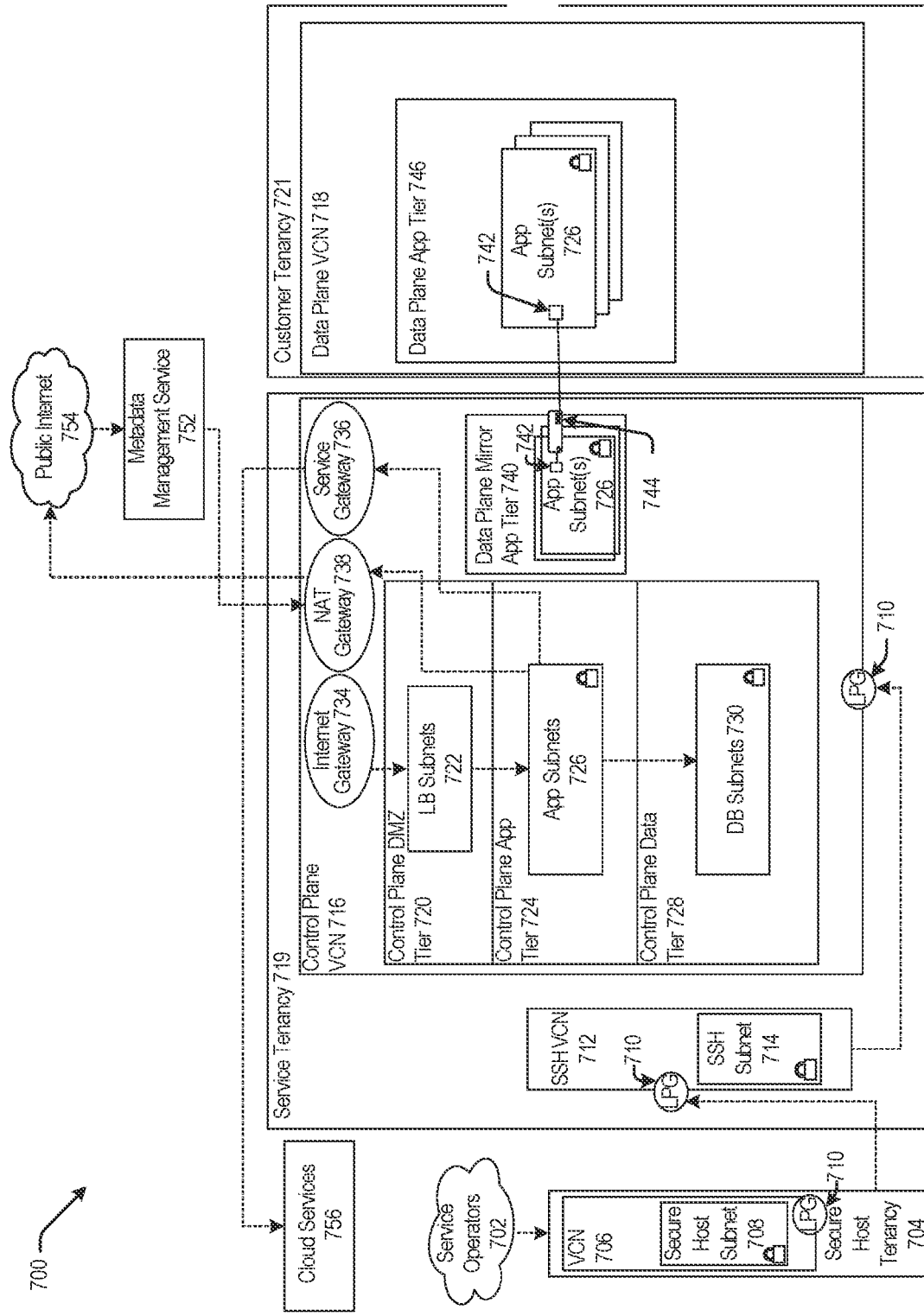
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
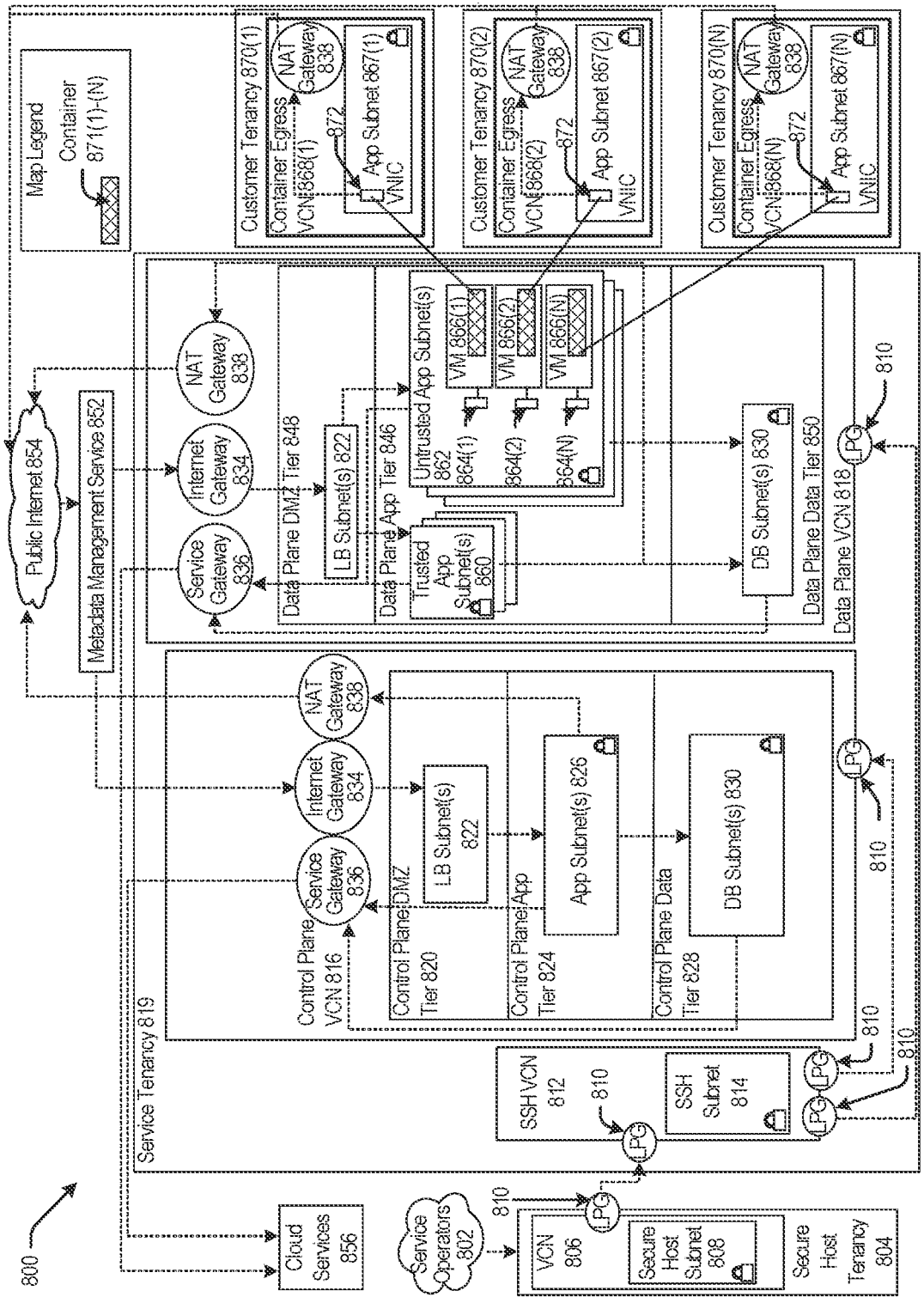
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
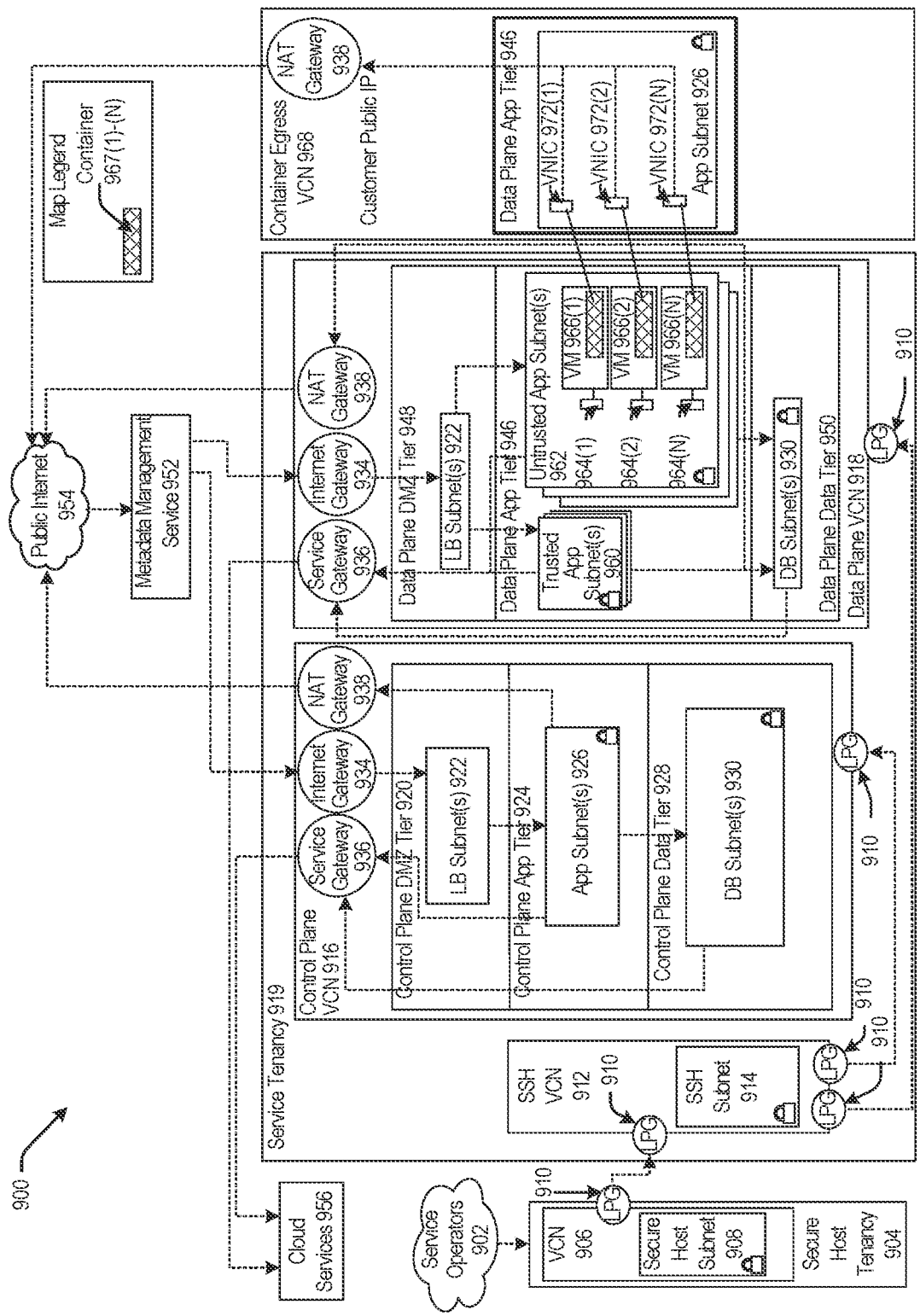
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
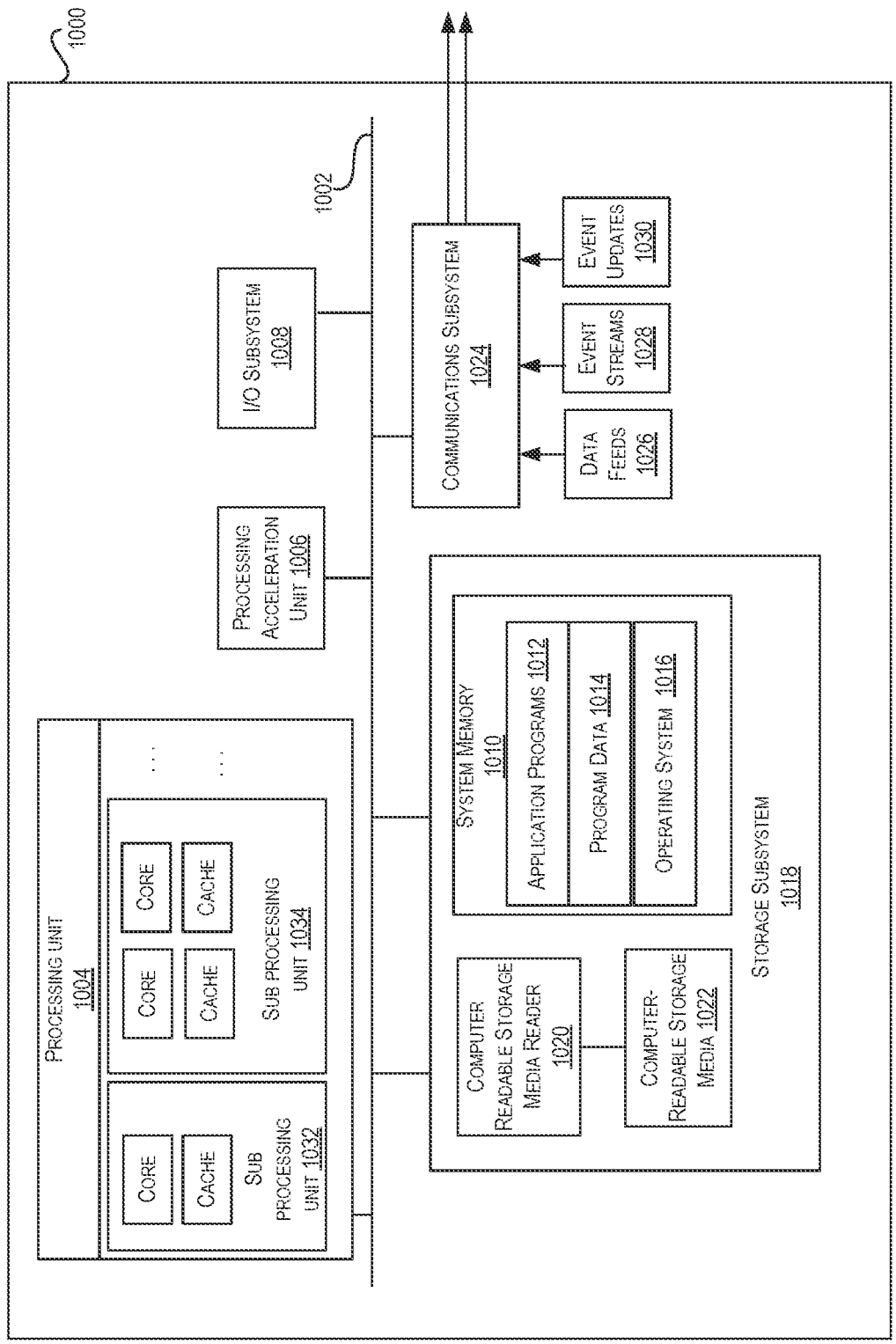
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   monitoring, by a computing device, a primary load of a datacenter and a reserve load of the datacenter, the primary load of the datacenter configured to be powered by one or more primary generator blocks having a primary capacity, the primary load being less than the primary capacity and the reserve load of the datacenter configured to be powered by one or more reserve generator blocks having a reserve capacity;
   subsequent to at least one of an increase in the primary load or a decrease in the primary capacity, detecting, by the computing device, that the primary load of the datacenter exceeds the primary capacity; and
   connecting, by a switch of the computing device, the one or more reserve generator blocks to at least one of the one or more primary generator blocks or the primary load,
   wherein subsequent to connecting the one or more reserve generator blocks to at least one of the one or more primary generator blocks or the primary load, the one or more reserve generator blocks are connected to (a) the reserve load and (b) at least one of the one or more primary generator blocks or the primary load.

2. The method of claim 1, wherein connecting the one or more reserve generator blocks further comprises:
   disconnecting, by a circuit breaker of the computing device, the reserve load from the one or more reserve generator blocks.

3. The method of claim 2, wherein the reserve load is disconnected if a combined load, comprising the primary load and the reserve load, exceeds a combined capacity comprising the primary capacity and the reserve capacity.

4. The method of claim 1, wherein power is supplied to the reserve load by the one or more reserve generator blocks and a utility power connection, where the utility power connection provides power to at least half of the reserve load.

5. The method of claim 1, wherein detecting that the primary load exceeds the primary capacity further comprises determining that a primary generator block of the one or more primary generator blocks has failed.

6. The method of claim 1, wherein the primary load is powered by the one or more primary generator blocks or the one or more reserve generator blocks with 99.999% availability.

7. The method of claim 1, wherein the reserve load is powered by the one or more reserve generator blocks with 99.9% availability.

8. A system comprising:
   a non-transitory computer-readable medium storing computer-executable program instructions; and
   a processing device communicatively coupled to the non-transitory computer-readable medium for executing the computer-executable program instructions, wherein executing the computer-executable program instructions configures the processing device to perform operations comprising:
   monitoring, by a computing device, a primary load of a datacenter and a reserve load of the datacenter, the primary load of the datacenter configured to be powered by one or more primary generator blocks having a primary capacity, the primary load being less than the primary capacity and the reserve load of the datacenter configured to be powered by one or more reserve generator blocks having a reserve capacity;
   subsequent to at least one of an increase in the primary load or a decrease in the primary capacity, detecting, by the computing device, that the primary load of the datacenter exceeds the primary capacity; and
   connecting, by a switch of the computing device, the one or more reserve generator blocks to at least one of the one or more primary generator blocks or the primary load,
   wherein subsequent to connecting the one or more reserve generator blocks to at least one of the one or more primary generator blocks or the primary load, the one or more reserve generator blocks are connected to (a) the reserve load and (b) at least one of the one or more primary generator blocks or the primary load.

9. The system of claim 8, wherein connecting the one or more reserve generator blocks further comprises:
   disconnecting, by a circuit breaker of the computing device, the reserve load from the one or more reserve generator blocks.

10. The system of claim 9, wherein the reserve load is disconnected if a combined load, comprising the primary load and the reserve load, exceeds a combined capacity comprising the primary capacity and the reserve capacity.

11. The system of claim 8, wherein power is supplied to the reserve load by the one or more reserve generator blocks and a utility power connection, where the utility power connection provides power to at least half of the reserve load.

12. The system of claim 8, wherein detecting that the primary load exceeds the primary capacity further comprises determining that a primary generator block of the one or more primary generator blocks has failed.

13. The system of claim 8, wherein the primary load is powered by the one or more primary generator blocks or the one or more reserve generator blocks with 99.999% availability.

14. The system of claim 8, wherein the reserve load is powered by the one or more reserve generator blocks with 99.9% availability.

15. A non-transitory computer-readable storage medium storing computer-executable program instructions, wherein when executed by a processing device, the computer-executable program instructions cause the processing device to perform operations comprising:
   monitoring, by a computing device, a primary load of a datacenter and a reserve load of the datacenter, the primary load of the datacenter configured to be powered by one or more primary generator blocks having a primary capacity, the primary load being less than the primary capacity and the reserve load of the datacenter configured to be powered by one or more reserve generator blocks having a reserve capacity;
   subsequent to at least one of an increase in the primary load or a decrease in the primary capacity, detecting, by the computing device, that the primary load of the datacenter exceeds the primary capacity; and connecting, by a switch of the computing device, the one or more reserve generator blocks to at least one of the one or more primary generator blocks or the primary load, wherein subsequent to connecting the one or more reserve generator blocks to at least one of the one or more primary generator blocks or the primary load, the one or more reserve generator blocks are connected to (a) the reserve load and (b) at least one of the one or more primary generator blocks or the primary load.

16. The medium of claim 15, wherein connecting the one or more reserve generator blocks further comprises:

disconnecting, by a circuit breaker of the computing device, the reserve load from the one or more reserve generator blocks.

17. The medium of claim 16, wherein the reserve load is disconnected if a combined load, comprising the primary load and the reserve load, exceeds a combined capacity comprising the primary capacity and the reserve capacity.

18. The medium of claim 15, wherein power is supplied to the reserve load by the one or more reserve generator blocks and a utility power connection, where the utility power connection provides power to at least half of the reserve load.

19. The medium of claim 15, wherein detecting that the primary load exceeds the primary capacity further comprises determining that a primary generator block of the one or more primary generator blocks has failed.

20. The medium of claim 15, wherein the primary load is powered by the one or more primary generator blocks or the one or more reserve generator blocks with 99.999% availability.

* * * * *